March 27, 1962  G. F. MILLER  3,026,650
PLANT SUPPORTING MEANS
Filed June 17, 1958

George F. Miller
INVENTOR

BY Eugene E. Stevens and Eugene E. Stevens III
ATTORNEYS

United States Patent Office

3,026,650
Patented Mar. 27, 1962

3,026,650
PLANT SUPPORTING MEANS
George F. Miller, 1555 E. 55th St., Cleveland, Ohio
Filed June 17, 1958, Ser. No. 742,551
4 Claims. (Cl. 47—46)

My invention relates to improvements in plant-supporting means for use in lieu of the conventional individual stakes that are employed in connection with cord or the like for supporting individual plants such as, for instance, tomato or other stalk-incorporating plants.

Briefly and generally stated, the invention has for its primary objects to provide plant-supporting means for supporting a plurality of plants in a row and which is readily adjustable so that it can be elevated to compensate for growth of the plants, the nature of the development being such that plants can be readily secured to the device without damage to foliage, stalks, etc., and in a fashion to adequately support the stalks and foliage and/or other load.

Additionally, the invention contemplates a device for the purpose specified which is inexpensive to manufacture, easy to assemble and disassemble, and strong and durable while being highly satisfactory in practical use.

Further aims of the invention are (1) to avoid the necessity of knotting cords or the like used to engage individual plant stalks, and (2) to provide a multiple plant fastener means-carrying bar having extensible end portions for separable engagement with posts or the like.

Various other objects and advantages of the invention will be readily apparent to those versed in the art as the description proceeds, reference being had to the accompanying drawing illustrating a now preferred example of my inventive concept. It is to be understood, however, that the invention is susceptible of other mechanical expressions within the spirit and scope of the subject matter claimed hereinafter.

In the drawing, wherein the same reference characters have been used to designate the same parts wherever they appear—

Figure 1:
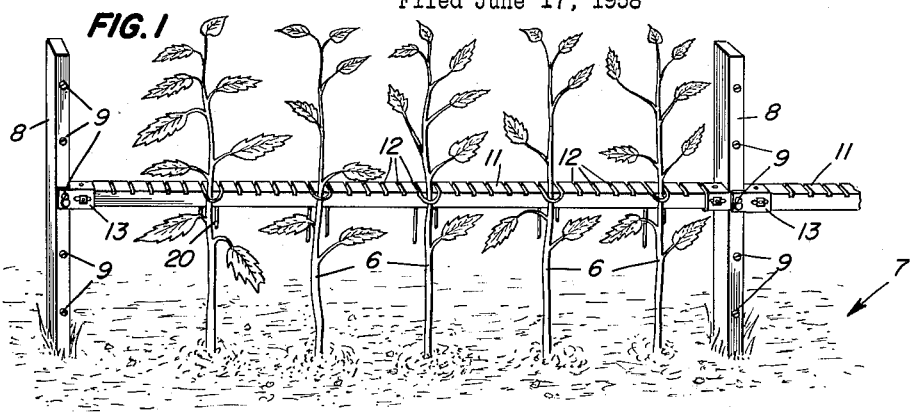
FIG. 1 is a perspective view of a multiple plant-supporting device embodying my invention.

Referring to the drawing by reference characters, numeral 6 indicates the stalks of the individual plants in a row which are illustrated as growing from the soil 7.

Generally stated, the multiple stalk-supporting device comprises the end posts 8 which are provided at at least one side with corresponding longitudinal series of spaced and headed screws or the like 9. Corresponding screws 9 of each post are employed to support, at different levels, the end brackets 10 which carry the plant stalk-supporting bar 11, all as illustrated in FIG. 1. The supporting bar 11 has the transverse saw cut grooves which carry the stalk-embracing or supporting cords 20, or the like, to be referred to more particularly hereinafter.

Figure 4:
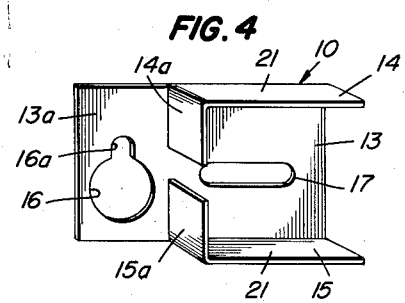
FIG. 4 is a perspective view of one of the post-carried bar-supporting brackets which are employed.

Referring to the post-carried bar-supporting end brackets 10, it will be noted that each is open at one side, as shown in FIG. 4, and has the opposite side wall 13 which provides the end extension 13a.

Figure 2:
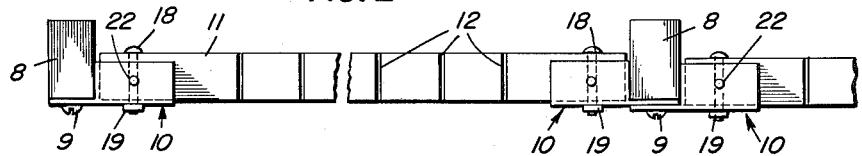
FIG. 2 is a partly broken top plan view.
Figure 3:
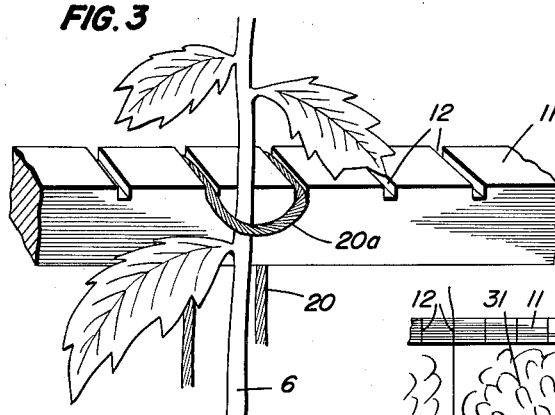
FIG. 3 is an enlarged fragmentary perspective of the plant-supporting bar and illustrating the application of one of the cord elements for supporting a plant stalk.

FIG. 4 also shows the brackets 10 as having the top and bottom walls 14, 15, respectively, which terminate short of the free end of said side wall extension 13a. The inner ends of respective top and bottom walls 14, 15 have the inturned flanges 14a, 15a, which are adapted to act as stops to abut the adjacent end of bar 11 as will be understood from an inspection of FIGS. 1 and 2.

The side wall extension 13a beyond the wall portions 14a, 15a is provided with the keyhole slot or cut-out 16 having the upper reduction 16a. The diameter of the major portion of the slot 16 is large enough to selectively receive the heads of the post-carried screws 9 so that the weight of the bar 11 and related bracket 10 will cause the shanks of series 9 to seat in the reduced upper ends 16a of the keyhole slots 16.

So as to extensibly secure the bar ends to the respective brackets 10, I provide the side wall 13 of each of the brackets with the closed horizontal slot 17 through which is adapted to project the free end of one of the elongated screws 18, which extend through the bar 11 adjacent each of its ends.

A nut 19 on the end of each screw 18 is adapted to be tightened to hold the related bracket 10 in adjusted position with respect to the end of the bar 11. Therefore, the brackets, as will be appreciated, can be adjusted lengthwise of the bar 11 so as to compensate for any reasonable over-spacement of the bar-supporting posts 8. Also, one or the other or both of the top and bottom bracket walls 14, 15 may have a hole 21 through which a nail or the like 22 can be driven into bar 11 to positively secure the related bracket against shifting.

The means for retaining the plant stalk 6 in supported relationship to the bar 11 comprises, as earlier noted, the lengths of cord or twine 20 which will be of such a cross-section to be functionally retained in the saw cut, or otherwise formed, grooves 12 when pressed down thereinto to provide the plant stalk-supporting or receiving loops 20a. It is a very simple matter to slip the intermediate portion 20a of the cord 20 about a plant stalk and then wedge the terminals of said cord 20 into the saw cut grooves 12.

From the foregoing description it will be readily apparent that initially the bar-carried brackets 10 will be supported by the lowermost ones of the post edge-carried screws 9, and that as the plants grow the bar will be elevated and supported by corresponding upper ones of the post-carried screws 9.

The device avoids any possibility of damage to the roots, stalks or foliage of the plants, and as will be appreciated, I am able to conveniently support a plurality of plants by the same bar 11. Obviously, the number of posts 8 can be multiplied so as to support a number of bracket ended bars in longitudinal series. This means that certain of the post-carried screws 9, when in use will support the adjacent brackets 10 of aligned bars, as suggested in FIG. 1. Thus, the plants of an elongated row can be adequately supported without employing individual stalks which may adversely affect plant roots. The end brackets 10 may be casting or stampings, and the bar 11 while preferably of wood, such as a 2 x 4 or other size, may be of other material.

It is important to note that the bracket 10 is open at one side so as to facilitate assembly of the same on the ends of bar 11. Also, particularly when the bracket 10 is formed as a stamping, the non-connection of end walls 14a, 15a facilitate the spreading of top and bottom walls 14, 15 as a means to further facilitate assembly of the brackets on the bar ends. Welding of end walls 14a, 15a to side wall 13, 13a is optional if the bracket 10 is a stamping but ordinarily welding will not be resorted to.

Also, the illustrated arrangement of top and bottom walls 14, 15 and the related end walls 14a, 15a provides reinforcement for the load-supporting side wall 13, 13a, as will be appreciated.

Figure 5:
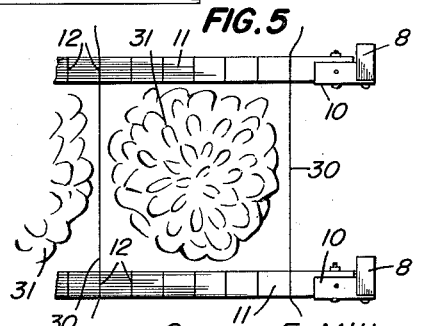
FIG. 5 is a top plan view of a modification particularly applicable to bushy type plants.

The modification shown in FIG. 5 is especially applicable to bushy type plants and involves duplicate units 8, 10, 11 such as are shown in FIG. 1 arranged in spaced parallelism. Here cords 30 frictioned into corresponding grooves 12 of the spaced bars 11 support the plants 31, as will be apparent.

Having thus described my invention, what I claim is:

1. A knockdown supporting means for row plants comprising in combination upstanding posts adapted to be embedded in the soil at the ends of a row or in spaced series in the direction of the length of the row, a bar between adjacent posts and having plant securing means, post-engaging bracket members carried at each end of the bar, each of said bracket members comprising a side wall and top and bottom walls, and being open at the other side to facilitate assembly of the bar ends and brackets, the top and bottom bracket walls terminating in inturned bar end stop-providing end wall portions providing opposed spaced ends, the bracket side wall having an extension extending beyond the end wall portions, a keyhole-like slot in said end wall extension and having a reduced upper portion, headed shank providing studs arranged in longitudinal series in at least one corresponding side edge of each of said posts, and the stud heads being adapted to be projected through the enlarged lower portions of the keyhole slots of said side wall extension whereby stud shanks will shift into the reduced upper slot portions so as to retainingly support the bar at different levels above the ground.

2. The structure of claim 1, and each bracket side wall having a closed longitudinally extending slot therein, and a bar-supported clamp nut-incorporating bolt extending through said bracket slot for adjustably securing the bracket to said bar end.

3. The structure of claim 1, and said bracket being of somewhat flexible material so that said top and bottom walls can be spread at least slightly to facilitate assembly of the bracket and bar end.

4. The structure of claim 1, and said bracket being of somewhat flexible material so that said top and bottom walls can be spread at least slightly to facilitate assembly of the bracket and bar end, and each bracket side wall having a closed longitudinally extending slot therein, and a bar-supported clamp nut-incorporating bolt extending through said bracket slot for adjustably securing the bracket to said bar end.

References Cited in the file of this patent

UNITED STATES PATENTS

| | | |
|---|---|---|
| 60,976 | Wightman | Jan. 1, 1867 |
| 358,461 | Lee | Mar. 1, 1887 |
| 1,048,079 | Keith | Dec. 24, 1912 |
| 1,204,868 | Harrah | Nov. 14, 1916 |
| 1,480,917 | Robinson | Jan. 15, 1924 |
| 1,677,362 | Oberdorfer | July 17, 1928 |
| 2,842,898 | Buckles | July 15, 1958 |

FOREIGN PATENTS

| | | |
|---|---|---|
| 108,595 | Austria | Jan. 10, 1928 |
| 43,543 | France | Apr. 9, 1934 |
| 44,642 | Switzerland | May 27, 1908 |